(12) United States Patent
Thiel et al.

(10) Patent No.: US 11,795,611 B2
(45) Date of Patent: Oct. 24, 2023

(54) MULTILAYER COMPOSITE FILM MADE OF PLASTIC

(71) Applicant: Benecke-Kaliko AG, Hannover (DE)

(72) Inventors: Maik Thiel, Hannover (DE); Martin Köhl, Hannover (DE); Doreen Herzog, Hannover (DE); Karl Buchkremer, Hannover (DE)

(73) Assignee: Benecke-Kaliko AG, Hannover (DE)

( * ) Notice: Subject to any disclaimer, the term of this patent is extended or adjusted under 35 U.S.C. 154(b) by 187 days.

(21) Appl. No.: 17/269,360

(22) PCT Filed: Jul. 15, 2019

(86) PCT No.: PCT/EP2019/068935
§ 371 (c)(1),
(2) Date: Feb. 18, 2021

(87) PCT Pub. No.: WO2020/038656
PCT Pub. Date: Feb. 27, 2020

(65) Prior Publication Data
US 2021/0348326 A1 Nov. 11, 2021

(30) Foreign Application Priority Data
Aug. 23, 2018 (DE) .................. 10 2018 214 240.8

(51) Int. Cl.
*D06N 3/06* (2006.01)
*D06N 3/00* (2006.01)

(52) U.S. Cl.
CPC ......... *D06N 3/0065* (2013.01); *D06N 3/0086* (2013.01); *D06N 3/06* (2013.01);
(Continued)

(58) Field of Classification Search
CPC ......... G11C 16/10; G11C 16/12; G11C 16/16; G11C 16/3418; G11C 16/02;
(Continued)

(56) References Cited

U.S. PATENT DOCUMENTS

2005/0122732 A1 6/2005 Garcia et al.
2017/0139506 A1 5/2017 Rodriguez et al.

FOREIGN PATENT DOCUMENTS

DE 19859195 A1 6/2000
DE 102005038680 A1 2/2006
(Continued)

OTHER PUBLICATIONS

Observation by a Third Party dated Nov. 8, 2021 in the EP application 19739988.4 (EP application is based on PCT/EP2019/068935).
(Continued)

*Primary Examiner* — Lawrence D Ferguson
(74) *Attorney, Agent, or Firm* — Gregory Adams

(57) ABSTRACT

The invention relates to a multilayered composite film made of plastic and in the form of a surface coating for an article, wherein the composite film is at least partly transparent, i.e. is transparent in partial regions, has at least one outer transparent top layer which is optionally provided with a transparent coating, and has, on the rear side of the top layer, one or more further transparent plastic layers and also a transparent carrier layer, wherein arranged inside the layer composite is an opaque layer which is in the form of a sheet-like masking or diaphragm provided with openings and is transparent only in the openings of the masking or diaphragm, wherein the opaque layer adjoins the rear side of the top layer in the direction of the carrier layer, wherein the base material of the opaque layer is the same as that of the top layer.

15 Claims, 1 Drawing Sheet

(52) U.S. Cl.
CPC ............... *D06N 2209/0823* (2013.01); *D06N 2209/0853* (2013.01); *D06N 2209/0861* (2013.01); *D06N 2211/261* (2013.01); *D06N 2213/04* (2013.01)

(58) Field of Classification Search
CPC ............ B32B 2250/04; B32B 2250/05; B32B 2250/44; B32B 2255/00; B32B 2255/02; B32B 2255/10; B32B 2255/24; B32B 2255/26; B32B 2260/00; B32B 2262/0284; B32B 2307/202; B32B 2307/41; B32B 2307/412; B32B 2307/414; B32B 2479/00; B32B 2601/00; B32B 2605/003; B32B 27/08; B32B 27/12; B32B 27/20; B32B 27/304; B32B 3/02; B32B 3/26; B32B 3/30; B32B 5/00; B32B 5/24; B32B 5/245; B32B 7/02; B32B 7/12; B60Q 3/14; B60Q 3/54; B60Q 3/745; D06N 2209/0823; D06N 2209/0853; D06N 2209/0861; D06N 2211/261; D06N 2213/04; D06N 3/0063; D06N 3/0065; D06N 3/0086; D06N 3/0095; D06N 3/06; D06N 7/0092

See application file for complete search history.

(56) References Cited

FOREIGN PATENT DOCUMENTS

| | | |
|---|---|---|
| DE | 102009007336 A1 | 9/2010 |
| DE | 102010051166 A1 | 10/2011 |
| DE | 102015101012 A1 | 7/2016 |
| DE | 102015101331 A1 | 8/2016 |
| DE | 202017104984 U1 | 8/2018 |
| EP | 3168715 A1 | 5/2017 |
| EP | 3184348 A2 | 6/2017 |
| GA | 2454911 A1 | 2/2003 |

OTHER PUBLICATIONS

International Search Report dated Oct. 18, 2019 of PCT application PCT/EP2019/068935 on which this application s based.
Wikipedia—Plastisol (https://en.wikipedia.org/w/index.php?title=Plastisol&oldid=829424693).
EP Office Action dated Jul. 18, 2023 of EP counterpart application 19739988.4.

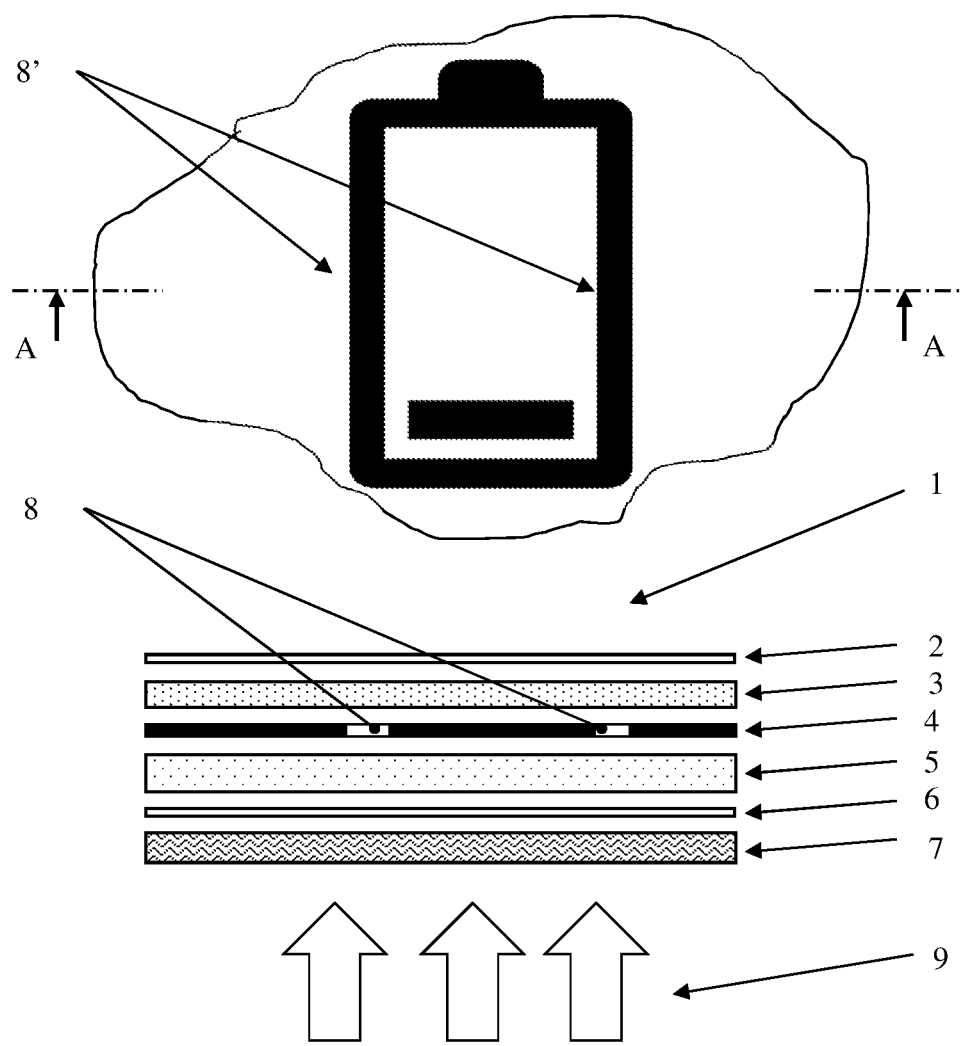

MULTILAYER COMPOSITE FILM MADE OF PLASTIC

The invention relates to a multilayered composite film made of plastic and in the form of a surface coating for an article, wherein the composite film is at least partly transparent, i.e. is transparent in partial regions of its surface, has at least one outer transparent top layer which is optionally provided with a transparent coating, and has, on the rear side of the top layer, one or more further transparent plastic layers and also a transparent carrier layer, wherein arranged inside the layer composite is an opaque, i.e. nontransparent layer which is in the form of a sheet-like masking or diaphragm provided with openings and is transparent only in the openings of the masking or diaphragm. The invention likewise relates to a method for producing such a film and to a particular use.

Films in the form of multilayered composite films for coating or as surfaces of any kind of articles are extensively known in the prior art, for instance also in the surface finish of furniture and in the case of interior trim parts of vehicles, in particular motor vehicles. In the case of the latter, grained, patterned or finely structured plastic skins are used as surfaces for the interior trim, here often as relatively soft foam-backed films having pleasant haptics, for instance for trimming dashboards or interior door panels etc. With appropriate adaptation for strength and design, such films are of course also used for other high-quality coated goods.

Films for the interior trim of motor vehicles, for furniture, bags etc., commonly also referred to as imitation leather, often have a multilayered structure, are often foam-backed and show on their top side three-dimensionally structured surfaces having a wide variety of forms and configurations. The multilayered structure generally consists of an upper top layer or decorative layer, which is provided with the embossed or impressed surface, and one or more lower layers. The top layer is generally provided with a coating layer and may also be colored. By formulating the layers appropriately, including by adapted softness or by the already mentioned foamed layers, a pleasing haptic effect is obtained, i.e. a pleasingly "soft" feel of the plastic film and also a certain sheen.

The prior art discloses various processes for producing such plastic skins, for example rolling and/or embossing processes for producing "continuous" film webs made of thermoplastic material or processes for producing individual molded skins, i.e. plastic moldings, directly from the mold.

The ever-increasing demand for comfort devices, for example in the field of vehicle equipment, has the result not just in these fields that there is a desire for ever-increasing individualization of articles and the integration of functions into consumer articles or their surfaces is today also being brought to the attention of the customer.

Staying with vehicles, attention of late has been directed at covering materials or flexible surface-area materials with integrated functional, sensor or signal elements, in particular also at the integration of lighting or signal lights into the films used to coat or trim components. It has thus already been proposed to attach electroluminescent elements or layers into or onto components or trim parts for the interior space of motor vehicles. In this regard, CA 2 454 911 A1 discloses a vehicle headlining in the form of a molding provided with strip-like electroluminescent elements. The vehicle headlining in this case consists of a molded carrier which is pressed with a coating film to form a component. Electroluminescent elements are thereby initially positioned in the carrier, passed through the carrier with their connection cables and then covered, fixed and compressed with the applied coating film. A relatively complicated design is, however, necessary for this purpose. In addition, in this implementation, the electroluminescent elements behind the decorative surface/coating film can also become visible as bulges.

DE 10 2005 038 680 A1 discloses a component of a motor vehicle having a three-dimensional surface which has an electroluminescent layer and is back-molded with thermoplastic material to fix the component shape. This method is thus essentially used to produce relatively small, non-flexible lighting elements, such as for example illuminated pushbutton switches or lighting means. The production of larger parts is rather difficult with this design.

DE 10 2015 101 331 A1 discloses an imitation leather which is arranged on a textile carrier material and is in the form of a composite film which has a transparent layer structure and a transparency for visible light in a range of from 0.4-60%. Arranged inside the surface coating of this composite film, or else inside the layer structure, is what is known as a color structure which brings about a reduction of the transparency where it is arranged. Depending on the arrangement of the color structure, it can always be seen or can only be seen when the imitation leather is transilluminated.

DE 10 2010 051 166 A1 discloses a method for producing a material with an opaque surface having a graphic which is visible when the surface is backlit, a logo or an animation. Here, on a film, the graphic per se is kept or configured as transparent and the intermediate spaces are kept or configured as opaque, and after this a transparent layer is applied.

The problem which in particular always arises when the intention is for alphanumeric symbols or logos constituted by diaphragms or maskings to be apparent when the surface of a film is backlit is that the appearance of these symbols is blurred to a certain extent. This therefore leads e.g. to the situation in which, for instance, the light that passes further translucent films on its passage path is subject to a diffuse distribution during the passage, and also or additionally a diffraction occurs at the edges of the diaphragm or masking. A viewer observing the outer side of a backlit film thus often sees only a blurred symbol or logo. This is in particular the case when, for example, a diaphragm or masking is placed behind a film and directly in front of the lighting means. Such a blurry representation is not desired in the context of contemporary high quality requirements in the automotive sector.

The object of the invention was therefore to provide a film for the surface coating of articles, which contains a functionalization in the form of an illumination or the outputting of light signals and with which it is possible to achieve a distinct and sharp representation of symbols, logos or light patterns in or on the surface.

Said object is achieved by the features of the main claim. Further advantageous embodiments are disclosed in the dependent claims.

In the composite film according to the invention, for this purpose the opaque layer directly adjoins the rear side of the top layer in the direction of the carrier layer, wherein the base material of the opaque layer is the same as that of the top layer, i.e. corresponds to the base material of the top layer. What is referred to here as base material is the plastics material of the layers that is substantially and largely present and of course can comprise various additives for setting the further material properties.

The opaque layer, which is in the form of a sheet-like masking or diaphragm provided with openings, thus directly adjoins the top layer, as a result of which a sufficiently distinct and sharp reproduction of the openings constituted by the masking in the form of logos or symbols etc., advantageously of course in the form of symbols, identifiers or alphanumeric characters with corresponding meaning, is possible when there is backlighting from the rear side of the opaque layer.

In the case of a correspondingly thin, transparent top layer, a slightly diffuse light distribution of the light passing through the diaphragm and also diffraction at the edges of the openings of the opaque layer are largely reduced when the rear side of the entire film is transilluminated. The path covered by the light after passage through the masking or diaphragm as far as the image on the surface of the top layer or the coating is short enough that appreciable diffusion does not arise. The image created by the diaphragm or masking on the surface of the top layer is thus very distinct and sharply demarcated.

This advantageous effect is supported in that the top layer and the opaque layer formed as a masking or diaphragm comprise the same base material. As a result, the two layers have the same behavior, for example when subjected to mechanical loading or under the influence of temperature.

A multilayered composite film in which these two layers consist of the same base material can therefore be stretched or pulled easily over moldings without the clarity of the representations of the images created by the diaphragm or masking being adversely affected.

It is also advantageous when the rear-side carrier layer is a textile carrier layer. Such a textile carrier layer causes the layer composite film to become an imitation leather which can be sewn up without problems, specifically like a natural leather.

A further refinement consists in the opaque layer having a pigmentation and viscosity which differ from the pigmentation and viscosity of the top layer. What is meant here is a difference both in the number and the type or color of the pigments.

This makes it possible, in a relatively simple manner, to adapt both the passage of light through the openings of the masking or diaphragm and also the passage of light through the top layer lying on top, with the result that the appearance of the surface of the top layer can also be optimized thereby. In this respect, the adaptation can be implemented such that both the intensity of the light passing through and the color thereof can be influenced, for example by adding different color pigments the colors of which optionally interact.

A further advantageous embodiment consists in the transparent top layer, the transparent plastic layers, the carrier layer and the opaque layer having such a pigmentation that, when light is incident on the composite film, a uniform and nontransparent color impression is produced by the surface of the composite film, i.e. in that the patterns or openings of the masking or diaphragm are not visible on the surface. Only in the case of backlighting, i.e. in the case of transillumination, can the outlines of the openings of the opaque layer be seen on the surface of the composite film. This can also be achieved by adding pigments, or pigments the colors of which interact in this respect, which differ in number and type, to the material of the respective layers.

An advantageously simple configuration of a transparent multilayered composite film according to the invention is produced in that a light-emitting or light-conducting layer, preferably an electroluminescent layer that can be activated via electrodes, is formed below the opaque layer in the direction of the carrier layer. As a result, separate lighting means arranged below the entire layer composite are dispensed with.

Such a light-emitting layer can also be formed such that a layer, for example an optical layer made of PET or PET fibers, which is laterally illuminated and distributes the incident light diffusely over a surface region of the layer composite, is arranged within the layer composite.

A particularly suitable method for producing a multilayered composite film according to the invention consists in the production taking place in a reverse coating method with the following steps:
  applying a topcoat that forms the top layer and is made of a preferably pasty plastic material to a carrier film,
  applying a masking coat that forms the opaque layer to the top layer, wherein the material of the masking coat corresponds to the material of the topcoat except in terms of pigmentation and viscosity,
  applying further plastic coats and/or plastic foam coats, forming transparent layers, as well as optionally transparent laminating or adhesive coats,
  applying a carrier layer, preferably a textile carrier layer, to the existing layer composite,
wherein, after sufficient drying or gelling of the layer composite, the carrier film is taken off and the underlying surface of the top layer of the layer composite is optionally coated.

A surface structure of the film composite can then be formed either by a grained carrier film which contains the negative of the graining and to which the top layer is applied, or after production of the film by an embossing operation.

A reverse coating method configured in such a way makes it possible, in particular, to apply the opaque layer in a dimensionally accurate manner, i.e. here in particular with respect to the masking or diaphragm in a manner true to the length and the surface of its openings, since the application to the top layer which is stably supported by a carrier film takes place optionally in contact with a base, a coating table or else with the stretched carrier film. In this way, the masking does not have to be applied for instance to a soft layer composite which could possibly deform and then constitute an unstable base.

The length-true nature and surface-true nature of the masking are supported by an advantageous refinement of the method in which the masking coat forming the opaque layer is applied to the top layer in a printing process, preferably in a screen printing process. In conjunction with a correspondingly set viscosity of the opaque layer, the result here is a particularly simple, precise and sharp-edged application of the masking or diaphragm.

Setting the viscosity of the opaque layer and top layer differently during the application by virtue of the reverse coating method according to the invention makes it possible to substantially facilitate the application of the opaque layer to the top layer, in particular when it is applied by a printing method. The viscosity of the opaque layer is then set such that it is correctly set for the printing method applied. In this respect, the viscosity of the top layer can be set higher or lower than the viscosity of the opaque layer.

A further advantageous embodiment of the method consists in that both the topcoat and the masking coat are applied in the form of a mass of pasty polyvinyl chloride (plastisol). Such a paste can be coated and handled easily by the known method and incorporated into the conventional manufacturing processes.

The multilayered composite film according to the invention can be used in particular as a coating of an interior trim part for a motor vehicle, as already specified above. Many interior trim parts there are subjected specifically to considerable strain when they are pulled onto corresponding support structures. This is the case for example with a dashboard which has multiple bulges. The multilayered composite film according to the invention is best suited for this purpose and also does not have any deficiencies in terms of the clarity of the representations or in the images created by the diaphragm or masking after being applied to a molded structural part.

The invention will be explained in more detail on the basis of an exemplary embodiment.

The single FIGURE, FIG. 1, schematically shows an enlarged view of a partial region of a multilayered composite film 1 according to the invention for an interior trim part of a central console of a motor vehicle during transillumination in the top part, and a section A-A through this partial region in the bottom part.

In this respect, the interior trim part has a top layer 3 which is made of a polyvinyl chloride (PVC) and provided with an outer transparent coating layer 2. In this embodiment, the top layer 3 is for its part likewise transparent, specifically colored with pigments to an extent of only approximately 30%, and thus lets a certain percentage of the light incident on its rear side through.

Arranged inside the entire layer composite is an opaque, i.e. nontransparent layer 4, which is in the form of a sheet-like masking or diaphragm provided with openings and is only transparent in the openings 8 of the masking or diaphragm. The opaque layer 4 directly adjoins the rear side of the top layer 3 in the direction of the carrier layer 7. The base material of the opaque layer 4 consists of PVC and is the same as that of the top layer 3.

Arranged below the opaque layer 4 are a plurality of further transparent plastic layers, specifically a transparent/translucent plastic foam layer 5 and also a transparent adhesive layer 6.

Finally, adjacent in the downward direction is a transparent textile carrier layer 7, so that the multilayered composite film can be easily processed and sewed up like an artificial leather.

When there is backlighting from the rear side of the composite film, shown here by the arrow 9, a distinct and clear-cut image 8' of the openings 8 incorporated in the masking or diaphragm is produced on the outer surface of the top layer 3 or the coating layer 2, here for example in the form of a symbol for a battery charge, as is shown by the detail illustrated in the top part of FIG. 1 of a view of the multilayered composite film according to the invention.

LIST OF REFERENCE SIGNS (Part of the Description)
  1 Multilayered composite film
  2 Coating layer
  3 Top layer/Topcoat
  4 Opaque layer/Masking or diaphragm
  5 Plastic foam layer/Intermediate coat
  6 Adhesive layer/Laminating coat
  7 Textile carrier layer
  8 Opening in the masking or diaphragm
  8' Image of the masking
  9 Backlighting (in principle)

The invention claimed is:

1. A multilayered composite film comprising:
a top layer provided with an outer transparent coating layer on the top layer and a rear side, the top layer colored with pigments and lets a percentage of light incident on its rear side through;
an opaque nontransparent layer that adjoins the rear side of the top layer and is in a form of a masking with openings that are transparent;
a plurality of further transparent plastic layers that include a translucent plastic foam layer and a transparent adhesive layer are arranged below and adjacent the opaque layer;
a transparent textile carrier layer adjacent and below the plurality of further transparent plastic layers; and
the opaque layer and the top layer comprise the same base material.

2. The film of claim 1, wherein the coating layer displays an image based on the openings of the opaque layer in response to backlighting from below the transparent textile carrier layer.

3. The film of claim 2, the image is a battery symbol.

4. The film of claim 1, the openings are in the form of alphanumeric characters.

5. The film of claim 1, the opaque layer comprises a pigmentation that differs from the pigmentation of the top layer.

6. The film of claim 1, in which the transparent top layer, the transparent plastic layers, the carrier layer and the opaque layer have a pigmentation that, when light is incident on the composite film, a uniform and nontransparent color impression is produced by the surface of the composite film and that, in the case of backlighting, the outlines or the image (8') of the openings of the opaque layer can be seen on the surface of the composite film.

7. The film of claim 1, further comprising a light emitting layer below and adjacent the carrier layer.

8. The film of claim 7, the light emitting layer comprising an electroluminescent layer activated via electrodes.

9. The film of claim 1, the top layer made of polyvinyl chloride (PVC).

10. The film of claim 1, the opaque layer made of polyvinyl chloride (PVC).

11. The film of claim 1, the top layer formed of a pasty plastic material.

12. The film of claim 1, the opaque layer applied to the rear side of the top layer by screen printing.

13. The film of claim 1, the film applied to an interior trim part of a motor vehicle.

14. The film of claim 1, the transparent textile carrier layer configured to be sewable like artificial leather.

15. The film of claim 1, the pigments of the top layer are about 30 percent.

* * * * *